(12) United States Patent
Steed

(10) Patent No.: US 6,967,654 B2
(45) Date of Patent: Nov. 22, 2005

(54) SYSTEM AND METHOD FOR SPECIFYING ELLIPTICAL PARAMETERS

(75) Inventor: Arnold F. Steed, Houston, TX (US)

(73) Assignee: Computer Associates Think, Inc., Islandia, NY (US)

( * ) Notice: Subject to any disclaimer, the term of this patent is extended or adjusted under 35 U.S.C. 154(b) by 97 days.

(21) Appl. No.: 10/367,077

(22) Filed: Feb. 14, 2003

(65) Prior Publication Data

US 2003/0156123 A1 Aug. 21, 2003

Related U.S. Application Data

(60) Provisional application No. 60/357,480, filed on Feb. 15, 2002.

(51) Int. Cl.$^7$ .............................................. G06T 11/20
(52) U.S. Cl. ...................................... 345/442; 345/441
(58) Field of Search ............................... 345/440, 441, 345/442, 619, 427, 585, 420; 382/187

(56) References Cited

U.S. PATENT DOCUMENTS

| | | | |
|---|---|---|---|
| 4,618,989 A | | 10/1986 | Tsukune et al. |
| 5,003,498 A | * | 3/1991 | Ota et al. ................... 345/420 |
| 5,101,436 A | | 3/1992 | DeAguiar et al. ............. 382/1 |
| 5,268,998 A | | 12/1993 | Simpson |
| 5,425,109 A | * | 6/1995 | Saga et al. .................. 382/187 |
| 5,469,337 A | | 11/1995 | Cassarly et al. |
| 5,586,232 A | * | 12/1996 | Yoshida ....................... 345/427 |
| 5,734,751 A | | 3/1998 | Saito |
| 5,805,858 A | * | 9/1998 | Kumamoto et al. ............ 703/1 |
| 6,100,903 A | * | 8/2000 | Goettsche .................... 345/442 |
| 6,191,795 B1 | * | 2/2001 | Liepa ......................... 345/585 |
| 6,292,197 B1 | * | 9/2001 | Langelaan ................... 345/441 |
| 6,330,356 B1 | | 12/2001 | Sundareswaran et al. |
| 2004/0233461 A1 | | 11/2004 | Armstrong et al. |

OTHER PUBLICATIONS

Anonymous, "ModelCAD 99", Reference Manual, Upperspace Corporation (Online) 1999, cover, inside cover, and pp. 88, 89, 150 and 151, XP–002243817.

Hidaka, K., "User–Interface of a Tool for Learning Geometry", Computers & Education, UK, vol. 24, No. 1, pp. 59–66, XP–002243816, ISSN: 0360–1315, Jan. 1995.

PCT Invitation to Pay Additional Fees for PCT US03/04577, 4 pages, Jul. 7, 2003.

Weisstein, Eric W., "Ellipse", Ellipse Online, XP–002259309, http://164.8.13.169/Enciklopedija/math/math/e/e067.htm, pp. 1–11, Sep. 1996.

PCT International Search Report for PCT US03/04577, 8 pages, Nov. 13, 2003.

"Scalable Vector Graphics (SVG) 1.1 Specification," W3C$^{00}$Recommendation, Jan. 14, 2003; Abstract, Status of Document, Table of Contents, list of authors and acknowledgments (5 pages); 1 Introduction (8 pages); 2 Concepts (4 pages); 3 Rendering Model (4 pages); Appendix F: Implementation Requirements (10 pages). <http://www.w3.org/TR/SVG/index.html>, visited Feb. 7, 2005.

* cited by examiner

Primary Examiner—Matthew Luu
(74) Attorney, Agent, or Firm—Fish & Richardson P.C.

(57) ABSTRACT

An interactive elliptical arc control system and method are disclosed. Three control points are provided—a center control point and two foci control points—that a user can interactively manipulate in order to specify and change the elliptical parameters involved. The center control point can control the radius of the ellipse in the x direction, while keeping constant the ratio of the radius of the ellipse in the y direction to the radius of the ellipse in the x direction. The center control point can also control the relationship of the sweep flag to the large arc flag involved. The two foci control points can control the ratio of the radius of the ellipse in the y direction to the radius of the ellipse in the x direction, the angle from the x-axis of the coordinate system to the x-axis of the ellipse, and the value of the sweep flag.

21 Claims, 3 Drawing Sheets

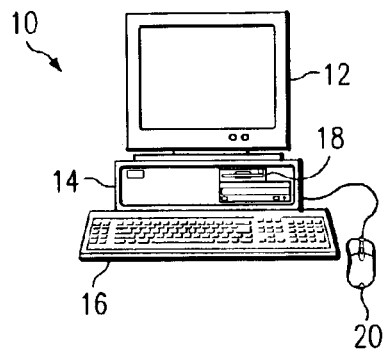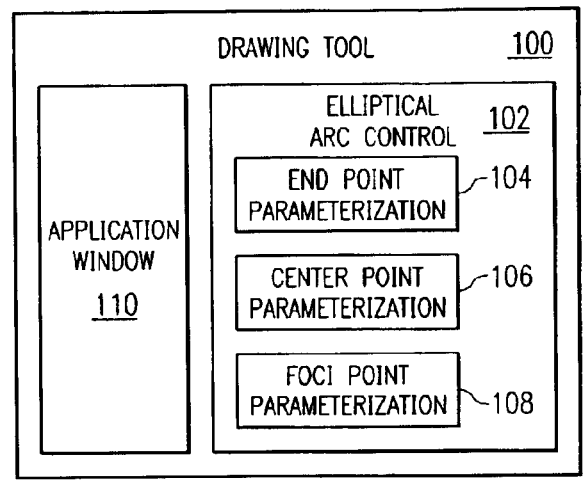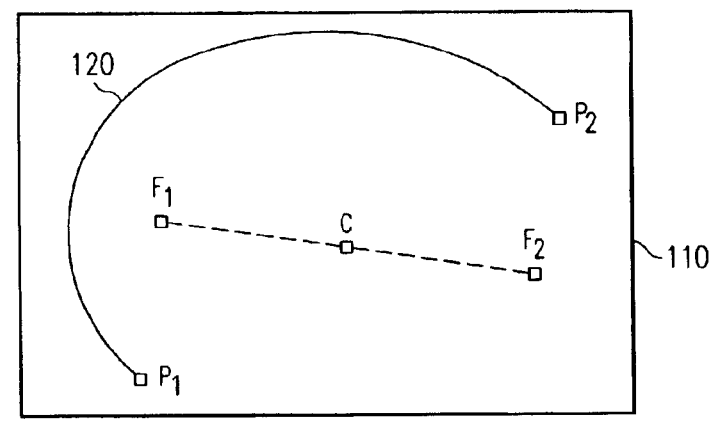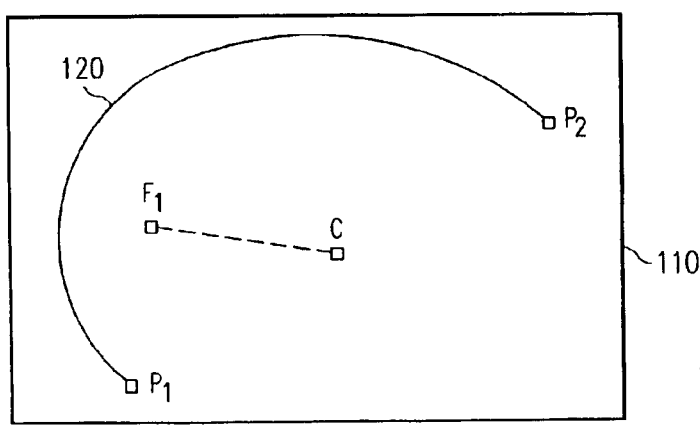

$f_A$ = FALSE
$f_S$ = FALSE

US 6,967,654 B2

SYSTEM AND METHOD FOR SPECIFYING ELLIPTICAL PARAMETERS

RELATED APPLICATION

This application claims the priority under 35 U.S.C. §119 of provisional application Ser. No. 60/357,480 filed Feb. 15, 2002.

TECHNICAL FIELD

The present disclosure relates in general to the Computer-Aided Design/Computer-Aided Manufacturing (CAD/CAM) field and, in particular, but not exclusively, to a system and method providing an intuitive and interactive interface for specifying parameters for computer-implemented drawing of arc segments, including elliptical arc segments.

BACKGROUND

Certain CAD/CAM drawing tools exist that include elliptical arcs. To simplify the user interface, these tools typically fix certain of the ellipses' parameters. For example, a common, simplified drawing technique used for creating an ellipse is to force the ellipse to be parallel either to the x- or y-axis, and then have the user draw a box into which the ellipse is to fit. Other drawing tools allow a user to manually enter (e.g., type in) the elliptical parameters, which can provide some design flexibility.

Certain CAD applications import and export Scalable Vector Graphics (SVG) data including elliptical arc segments. SVG is a vector-based CAD format that enables users to create dynamic interactive graphics that can be resized, animated, rotated, etc. in real-time. Each elliptical arc segment is specified in SVG with five elliptical parameters plus the endpoints of the segment involved.

SUMMARY

The present disclosure provides a method and system for specifying arc parameters for computer implemented drawings. In accordance with one embodiment, an interactive arc control system is provided for use in drawing and diagramming applications, which enables a user to completely specify the parameters of an arc (e.g., an elliptical arc) connecting two node points.

In one embodiment, the arc control system provides two control points—a center control point and a focus control point—that a user can interactively manipulate in order to change the parameters of a particular arc (e.g., an elliptical arc) being displayed. For example if an elliptical arc is displayed or being drawn, the center control point controls the radius of the ellipse in the x direction (semi-major axis), while keeping constant the ratio of the radius of the ellipse in the y direction (semi-minor axis) to the radius of the ellipse in the x direction (semi-major axis). The center control point can also control the relationship of the sweep flag (e.g., flag specifying whether the arc is to be drawn clockwise or counter-clockwise) to the large arc flag (e.g., flag specifying whether the larger or smaller arc of the ellipse is to be used). The focus control point controls the ratio of the radius of the ellipse in the y direction (semi-minor axis) to the radius of the ellipse in the x direction (semi-major axis), the angle from the x-axis of the coordinate system to the x-axis of the ellipse (rotation), and the sweep flag. As a result, the two control points described can be used to specify the parameters for an arc connecting two node points in an intuitive and relatively easy manner.

In an alternative embodiment, the arc control system provides three control points—a center control point and two foci control points—that a user can interactively manipulate in order to change the parameters of a particular arc (e.g., an elliptical arc) being displayed. Similarly, in this embodiment if an elliptical arc is being displayed, the center control point controls the radius of the ellipse in the x direction (semi-major axis), while keeping constant the ratio of the radius of the ellipse in the y direction (semi-minor axis) to the radius of the ellipse in the x direction (semi-major axis). The center control point can also control the relationship of the sweep flag (e.g., flag specifying whether the arc is to be drawn clockwise or counter-clockwise) to the large arc flag (e.g., flag specifying whether the larger or smaller arc of the ellipse is to be used). Each of the two foci control points can control the ratio of the radius of the ellipse in the y direction (semi-minor axis) to the radius of the ellipse in the x direction (semi-major axis), the angle from the x-axis of the coordinate system to the x-axis of the ellipse (rotation), and the sweep flag. As a result, the three control points described can be used to specify the parameters for an arc connecting two node points in an intuitive and relatively easy manner and provide greater symmetry of the displayed control.

BRIEF DESCRIPTION OF THE DRAWINGS

For a more complete understanding of the present disclosure reference is now made to the following descriptions, taken in conjunction with the accompanying drawings, in which:

FIG. 1 is an exemplary illustrates an example work station that can be used to implement one or more embodiments of the present disclosure;

FIG. 2 is an exemplary block diagram of a drawing tool of the elliptical arc control system according to the present disclosure;

FIGS. 3A–B are exemplary displays of an elliptical arc that a user can specify by interactively manipulating one or more of the control points shown;

DETAILED DESCRIPTION

Figure 4:
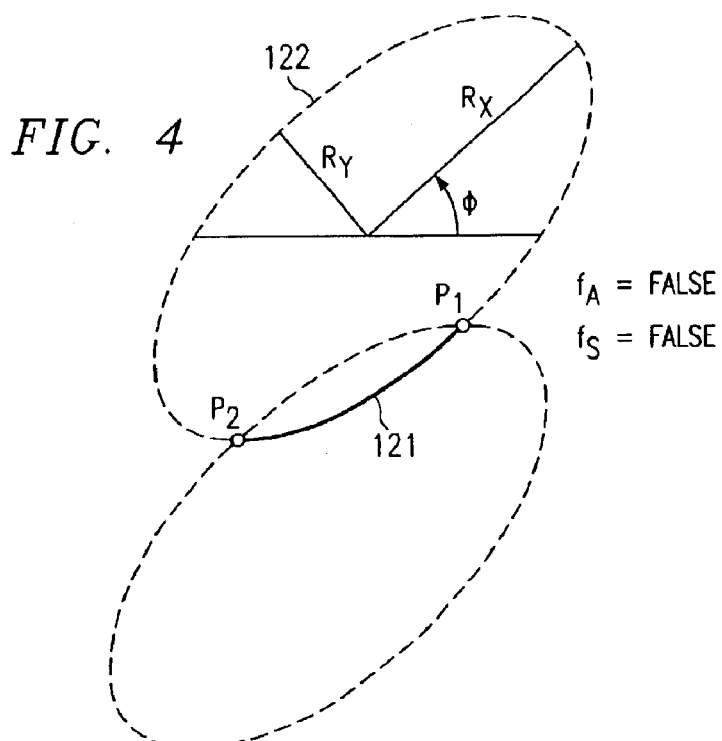
FIG. 4 illustrates elliptical arc parameters used for end point parameterization in an SVG system.

Referring to FIG. 1, an exemplary workstation 10 that can be used to implement one or more embodiments of the systems and methods of the present disclosure is provided. The workstation 10 can be a computer typically used for CAD/CAM or engineering applications, desktop publishing, software development, or other types of applications that provide relatively high quality graphics capabilities. For example, workstation 10 can be a desktop computer having a high-resolution graphics monitor 12, internal memory (e.g., Random Access Memory) 14, and a Graphical User Interface (GUI) 16. A mouse 20, other pointing device, or touch screen may be provided to allow a user to specify, select, move and/or otherwise control elements displayed by GUI 16 on monitor 12. The memory 14 may also include a mass storage device or media 18, such as a disk drive.

A suitable operating system for workstation 10 can be a UNIX® or WINDOWS NT® operating system. Workstation 10 can be a single-user computer, or a plurality of workstations, servers and/or other computer devices linked together to form one or more local area networks (LANs), metropolitan area networks (MANs), wide area networks (WANs), or a portion of a global network, such as the Internet.

Referring to FIG. 2 is an exemplary block diagram of an arc control system 100 according to one embodiment of the present disclosure. The arc control system 100 includes an application window 110 and an interactive arc control component 102. The elliptical arc control system 100 can be implemented in software and/or hardware. The application window 110 is displayed on monitor 12 by GUI 16, and allows users to generate objects (e.g., elliptical arcs) and to interactively modify the objects by manipulating one or more control points associated with the objects.

The interactive arc control system 102 includes an end point parameterization component 104, a center point parameterization component 106, and a foci point parameterization component 108. The end point parameterization component 104 is used by the system 100 to support Scalable Vector Graphics (SVG). The center parameterization component 106 is used for drawing an arc (e.g., an elliptical arc) for display in application window 110. The combination of the center parameterization component 106 and the foci parameterization component 108 provides user control of the arc (e.g., elliptical arc parameters) parameters by determining the arc parameters from control points graphically specified by the user through the application window 110. In a particular embodiment, the arc control system 102 may determine all of the parameters by converting, for example, elliptical parameters from one type to another while holding the end points of the arc fixed. In a specific embodiment, for example, the arc control system 102 may map endpoint parameters to center and/or foci parameters and may map center and/or foci parameters to each other and/or to endpoint parameters.

FIG. 3A illustrates an exemplary elliptical arc 120 displayed to and controllable by a user through application window 110. The elliptical arc 120 and any suitable SVG arc may be displayed to and manipulated by the user in real time. The elliptical arc 120 connects two endpoints, $P_1$ and $P_2$. Control points defining the elliptical arc's configuration are also displayed on application window 110. In the embodiment of FIG. 3A, three control points can be used for manipulating the arc displayed—a center point (C) and two foci points ($F_1$ and $F_2$). In an alternative embodiment, seen in FIG. 3B, two control points can be used for manipulating the arc displayed—a center point (C) and a foci point ($F_1$ or $F_2$). The configuration of the elliptical arc 120 can be specified by the user by interactively manipulating one or more of the center (C) or foci ($F_1$ and/or $F_2$) control points. Each end point $P_1$, $P_2$, and control point C and $F_1$ and/or $F_2$ can be independently manipulated by selecting and dragging the point with mouse 20 connected to GUI 16 of the workstation 10.

In the embodiments of FIGS. 3A–B at least one of the foci points, $F_1$ or $F_2$, is used based on the specified control points used the parameters to render the elliptical arc 120 and to support SVG or other standards for defining elliptical arcs can be determined. In a particular embodiment, the standardized parameters for SVG are provided by the end point parameterization component 104 (seen in FIG. 2) and are determined based on the control points using center parameterization component 106 and foci parameterization component 108.

FIG. 4 illustrates an exemplary ellipse 122 and elliptical arc 121 specified by the end point parameterization component 104. For example, with end point parameterization, the parameters $P_1$ and $P_2$ represent the start point and end point of the arc 121. The parameters $R_x$ and $R_y$ represent the radius of the ellipse 122 in the x direction and y direction, respectively. The parameter, $\phi$, represents the angle from the x-axis of the coordinate system to the x-axis of the ellipse 122 (e.g., rotation). The parameter, $f_A$, specifies whether the larger or smaller arc of the ellipse 122 is used (e.g., large arc flag), and the parameter, $f_S$, specifies whether the arc 121 is drawn clockwise or counter-clockwise (e.g., sweep flag). As described below, the end points $P_1$ and $P_2$ are entered by the user, and the remaining parameters of the arc to be displayed are indirectly determined from the control points by center and foci parameterization components 106 and 108.

Figure 5:
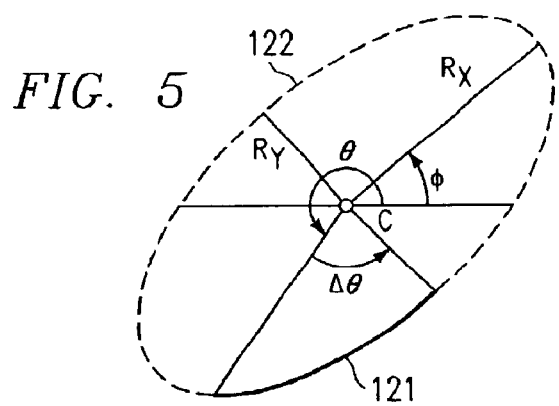
FIG. 5 illustrates elliptical arc parameters used for center point parameterization.

FIG. 5 illustrates the elliptical arc 121 specified by the center parameterization component 106. For example, with center point parameterization, the parameter C represents the center point of the arc 121. The parameters $\phi$, $R_x$ and $R_y$ are as previously described. The parameter, $\theta$, represents the start angle of the arc 121 (from the x-axis of the coordinate system), and the parameter $\Delta\theta$, represents the sweep angle of the arc 121 (e.g., negative for a clockwise arc).

Figure 6:
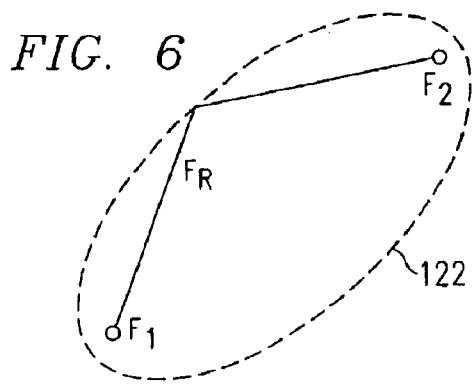
FIG. 6 illustrates elliptical arc parameters used for foci point parameterization.

FIG. 6 illustrates the ellipse 122 specified by the foci parameterization component 108. For example, with foci point parameterization, the parameter $F_1$ represents the first focal point of the ellipse 122, the parameter $F_2$ represents the second focal point of the ellipse 122, and the parameter $F_R$ represents the focal radius of the ellipse involved (sum of the distances from each of the foci to any point on the ellipse).

In one aspect of operation, the elliptical arc control system 102 allows a user to move one or more of the end points and control points (e.g., C, $P_1$, $P_2$, $F_1$, or $F_2$) shown in FIG. 3 in an interactive an intuitive manner and based on those points specifies all of the remaining end point, center and foci parameters shown in FIGS. 4, 5 and 6 based on the mathematical relationships that can exist between the elliptical parameters involved. The control points can be changed by a user "dragging" (e.g., with a cursor controlled by a mouse 20) these points directly on monitor 12 (e.g., via GUI 16).

For example, referring to FIG. 3, the foci, $F_1$ and $F_2$, lie on the semi-major axis of the elliptical arc 120. Consequently, the rotation angle, $\phi$ (FIGS. 4 and 5), can be computed from the foci, $F_1$ and $F_2$. Also, the radius of the ellipse in the x direction (semi-major axis), $R_x$ (FIGS. 4 and 5), can be determined by the relationship, $R_x = F_R/2$ (where $F_R$ in FIG. 6 is the focal radius of the ellipse 122 involved). If a parameter, $F_C$, represents the distance from either foci, $F_1$ or $F_2$, to the center of the ellipse 122 involved (FIG. 6), then the square of the radius of the ellipse in the y direction (semi-minor axis), $R_y^2$, is equal to the square of the radius of the ellipse in the x direction (semi-major axis), $R_x^2$, minus the square of the parameter, $F_C$ (e.g., $R_y^2 = R_x^2 - F_C^2$). The center point, C (FIG. 3), can determine which of the two possible ellipses can be used, and can also establish a relationship between the sweep flag, $F_S$, and the large arc flag, $F_A$ (e.g., either $F_A = F_S$ or $F_A$ not equal $F_S$). Also, the foci, $F_1$ and $F_2$ (FIG. 3), can be interchangeable (i.e., swapping the values of $F_1$ and $F_2$ can result in the same ellipse). Consequently, the relative positions of the foci, $F_1$ and $F_2$, can be used to determine the value of the sweep flag, $F_S$, without sacrificing generality. As such, rotating an ellipse by 180 degrees can result in flipping the value of the sweep flag, $F_S$ (from true to false or vice versa).

Figure 7:
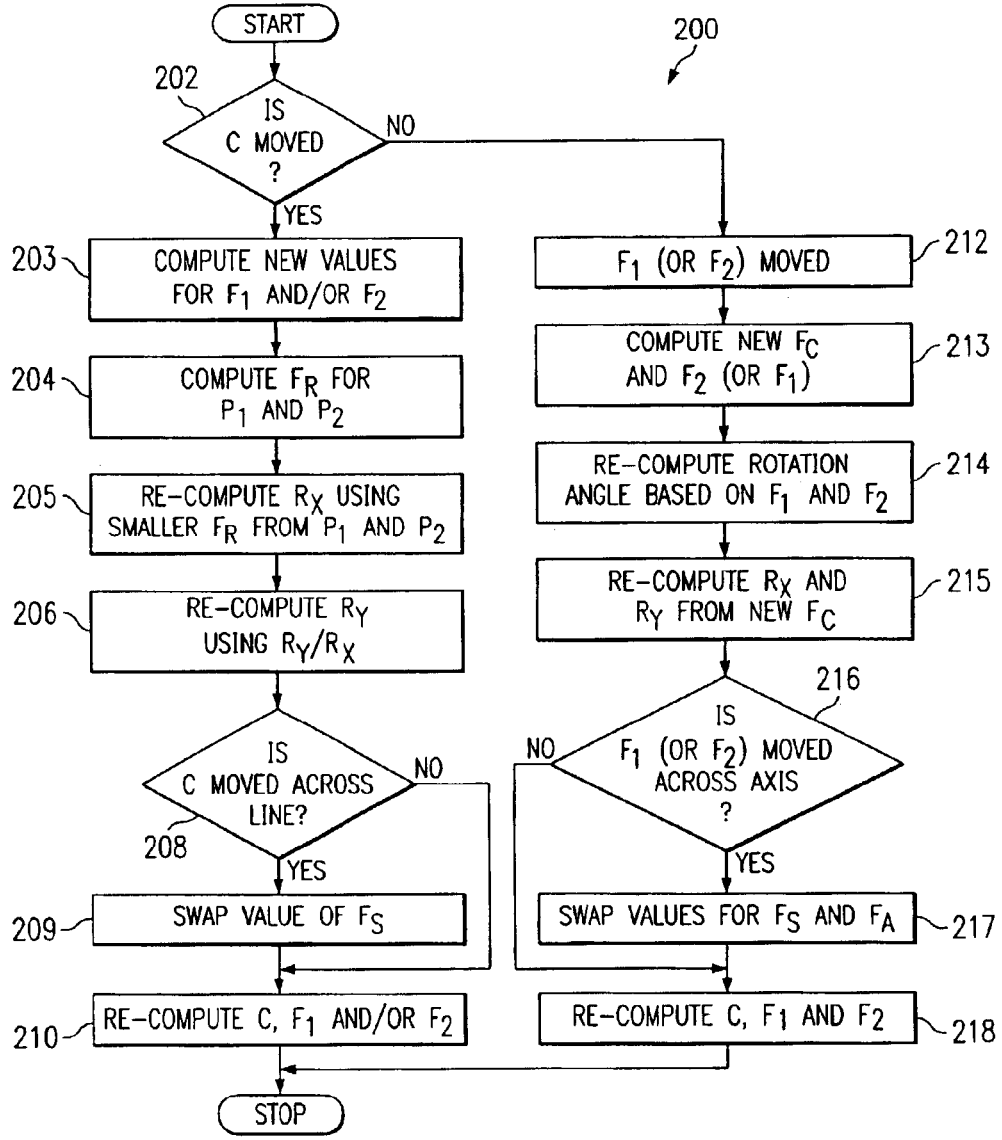
FIG. 7 is an exemplary flow diagram for implementing one exemplary embodiment of the present disclosure.

FIG. 7 illustrates an example method 200 that can be used to draw arcs in accordance with the present disclosure. As such, the above-described geometric relationships can be used to determine all of the end point parameters for an elliptical arc by a user manipulating one or more of the three control points, C, $F_1$ or $F_2$ (e.g., as shown in FIG. 3) using, for example, GUI 16 and elliptical arc control 102 (FIG. 2). At step 202, if a user moves the center control point, C, at step 203, new values can be computed for the foci control points, $F_1$ and $F_2$, with the value of the distance from either foci control point to the center of the ellipse, $F_C$, being held fixed. At step 204, the value of the focal radius, $F_R$, can be computed twice, based on the points, $P_1$ and $P_2$. At step 205, the smaller value of $F_R$ based on $P_1$ or $P_2$ can be used to re-compute the radius of the ellipse in the x direction (semi-major axis), $R_x$. At step 206, the value of the radius of the ellipse in the y direction (semi-minor axis), $R_y$, can be computed from the ratio of $R_y/R_x$. At step 208, if the center control point, C, is moved across a straight line joining the end points, P1 and P2, then at step 209, the value of $F_S$ can be swapped (e.g., the value of $F_A$ is maintained, but the relationship between $F_A$ and $F_S$ has changed). Otherwise, at step 210, the center and foci control parameters, C, $F_1$ and $F_2$, can be re-computed based on the new end point parameters, and the resulting curve and control points can be redrawn.

At step 212, if a user moves or "drags" the first focal point of the ellipse, $F_1$, at step 213, a new $F_C$ (distance from either foci to the center of the ellipse) and second focal point of the ellipse, $F_2$, can be computed with C and the focal radius, $F_R$, being held fixed. At step 214, the rotation angle, $\phi$, can be re-computed based on the new values of the foci control points, $F_1$ and $F_2$. At step 215, the new $F_C$ can be used to re-compute the radius of the ellipse in the x direction, $R_x$, and the radius of the ellipse in the y direction, $R_y$. At step 216, if a user moves the first focal control point, $F_1$, across the x-axis, at step 217, the values of each of the sweep flag, $f_S$, and the large arc flag, $f_A$, can be swapped. Otherwise, at step 218, the center and foci control parameters, C, $F_1$ and $F_2$, can be re-computed based on the new end point parameters, and the resulting curve and control points can be redrawn. The second focal point of the ellipse, $F_2$, may be manipulated by performing the same steps 212 through 218 as performed for the first focal point, $F_1$. In fact, the above-described function of interactively specifying elliptical parameters can be provided using only two of the control points shown (e.g., the center control point and one of the foci control points). However, a second foci control point (e.g., $F_1$ or $F_2$) can be included to provide a symmetrical and more intuitive interface to be used.

The end point parameters can be mapped to the movement of the center and foci control points, C, $F_1$ and $F_2$, in a number of other ways. For example, if a user moves the center control point, C, instead of computing the radius of the ellipse in the y direction, $R_y$, to maintain the ratio of $R_y/R_x$ constant, the value of $R_y$ can be computed to maintain $F_C$ constant. Also, if a user moves a focal control point (e.g., $F_1$), the other focal control point (e.g., $F_2$) can be maintained constant, instead of maintaining the position of the center control point, C, constant, and vice versa.

Although a preferred embodiment of the method and apparatus of the present disclosure has been illustrated in the accompanying drawings and described in the foregoing detailed description, it will be understood that the disclosure is not limited to the embodiment disclosed, but is capable of numerous rearrangements, modifications and substitutions without departing from the spirit of the disclosure as set forth and defined by the following claims.

What is claimed is:

1. A method for generating an elliptical arc in response to user input comprising:

receiving movement of at least one of a center control point, a first foci control point, and a second foci control point associated with the elliptical arc;

if the at least one center control point is moved, determining a value for at least one of the first foci control point and the second foci control point associated with the elliptical arc;

determining a value for a focal radius associated with the elliptical arc based on the value for at least one of the foci control points;

determining a value for a first radius of the elliptical arc based on the value for the focal radius, the first radius defined with respect to a first geometric axis associated with the elliptical arc;

determining a value for a second radius of the elliptical arc, the second radius defined with respect to a second geometric axis associated with the elliptical arc; and determining, based on the values for the first radius and the second radius, a new value for the at least one center control point, and the at least one of the first foci control point and the second foci control point associated with the elliptical arc.

2. The method of claim 1, further comprising:

if the first foci control point or the second foci control point is moved, determining a value for a distance from at least one of the first foci control point or the second foci control point to a center of the elliptical arc;

determining a value for a rotational angle associated with the elliptical arc based on at least one of the foci control points;

determining a value for the first radius of the elliptical arc;

determining a value for the second radius of the elliptical arc; and determining, based on the values for the rotational angle, the first radius, and the second radius, a new value for the at least one center control point, and the at least one of the first foci control point and the second foci control point associated with the elliptical arc.

3. The method of claim 2, wherein determining a value for the at least one of the first foci control point and the second foci control point associated with the elliptical arc if the center control point is moved, further comprises fixing the value for the distance from the at least one of the first foci control point or the second foci control point to the center of the elliptical arc.

4. The method of claim 2, wherein determining the value for the focal radius associated with the elliptical arc is performed with respect to a first end point of the elliptical arc and a second end point of the elliptical arc, and determining the value for the first radius of the elliptical arc is based on a smaller of two values computed for the focal radius.

5. The method of claim 1, wherein the first geometric axis comprises an x axis, and the second geometric axis comprises a y axis.

6. The method of claim 1, further comprising if the center control point is moved over a line connecting a first end point of the elliptical arc and a second end point of the elliptical arc, swapping a value for a sweep flag associated with the elliptical arc.

7. The method of claim 2, wherein determining the value for the second radius of the elliptical arc comprises maintaining a ratio between the value for the first radius of the elliptical arc and the value for the second radius of the elliptical arc.

8. The method of claim 2, wherein determining the value for the distance from the at least one of the first foci control point or the second foci control point to the center of the elliptical arc further comprises maintaining a value for the center control point and the focal radius associated with the elliptical arc.

9. The method of claim 2, wherein determining the value for the rotational angle associated with the elliptical arc further comprises determining the value for the rotational angle based on a value of the first foci control point or the second control point.

10. The method of claim 1, wherein if the foci control point is moved over a line representing the first geometric axis, swapping a value for a sweep flag associated with the elliptical arc and a value for a large arc flag associated with the elliptical arc.

11. A system for generating an elliptical arc, comprising:
a processor unit;
a display unit, the display unit coupled to the processor unit; and
an input device, the input device coupled to the processor unit, responsive to the input device, the processor unit operable to:
move at least one of a center control point, a first foci control point, and a second foci control point associated with the elliptical arc on the display;
if the at least one center control point is moved, determine a value for at least one of the first foci control point and the second foci control point associated with the elliptical arc;
determine a value for a focal radius associated with the elliptical arc based on the value for at least one of the foci control points;
determine a value for a first radius of the elliptical arc based on the value for the focal radius, the first radius defined with respect to a first geometric axis associated with the elliptical arc;
determine a value for a second radius of the elliptical arc, the second radius defined with respect to a second geometric axis associated with the elliptical arc; and
determine, based on the values of the first radius and the second radius, a new value for the at least one center control point, and the at least one of the first foci control point and the second foci control point associated with the elliptical arc.

12. The system of claim 11, wherein the processor unit is further operable to:
determine a value for a distance from at least one of the first foci control point or the second foci control point to a center of the elliptical arc, if the first foci control point or the second foci control point is moved;
determine a value for a rotational angle associated with the elliptical arc based on at least one of the foci control points;
determine a value for the first radius of the elliptical arc;
determine a value for the second radius of the elliptical arc; and
determine, based on the values for the rotational angle, the first radius and the second radius, a new value for the at least one center control point, and the at least one of the first foci control point and the second foci control point associated with the elliptical arc.

13. The system of claim 11, wherein the processor unit is operable to determine a value for the at least one of the first foci control point and the second foci control point associated with the elliptical arc if the center control point is moved, and is further operable to fix the value for the distance from the at least one of the first foci control point or the second foci control point to the center of the elliptical arc.

14. The system of claim 12, wherein the processor unit is operable to determine the value for the focal radius associated with the elliptical arc by performing with respect to a first end point of the elliptical arc and a second end point of the elliptical arc, and compute the value for the first radius of the elliptical arc based on a smaller of two values computed for the focal radius.

15. The system of claim 11, wherein the first geometric axis comprises an x axis, and the second geometric axis comprises a y axis.

16. The system of claim 11, wherein the processor unit is further operable to swap a value for a sweep flag associated with the elliptical arc, if the center control point is moved over a line connecting a first end point of the elliptical arc and a second end point of the elliptical arc.

17. The system of claim 12, wherein the processor unit is operable to determine the value for the second radius of the elliptical arc and is further operable to maintain a ratio between the value for the first radius of the elliptical arc and the value for the second radius of the elliptical arc.

18. The system of claim 11, wherein the processor unit is operable to determine the value for the distance from the at least one of the first foci control point or the second foci control point to the center of the elliptical arc and is further operable to maintain a value for the center control point and the focal radius associated with the elliptical arc.

19. The system of claim 12, wherein the processor unit is operable to determine the value for the rotational angle associated with the elliptical arc and is further operable to determine the value for the rotational angle based on a value of the first foci control point or the second control point.

20. The system of claim 11, wherein if the foci control point is moved over a line representing the first geometric axis, the processor unit is further operable to swap a value for a sweep flag associated with the elliptical arc and a value for a large arc flag associated with the elliptical arc.

21. Software for generating an elliptical arc in response to user input operable to:
receive movement of at least one of a center control point, a first foci control point, and a second foci control point associated with the elliptical arc;
if the at least one center control point is moved, determine a value for at least one of the first foci control point and the second foci control point associated with the elliptical arc;
determine a value for a focal radius associated with the elliptical arc based on the value for at least one of the foci control points;
determine a value for a first radius of the elliptical arc based on the value for the focal radius, the first radius defined with respect to a first geometric axis associated with the elliptical arc;
determine a value for a second radius of the elliptical arc, the second radius defined with respect to a second geometric axis associated with the elliptical arc; and
determine, based on the values for the first radius and the second radius, a new value for the at least one center control point, and the at least one of the first foci control point and the second foci control point associated with the elliptical arc.

* * * * *

UNITED STATES PATENT AND TRADEMARK OFFICE
CERTIFICATE OF CORRECTION

PATENT NO. : 6,967,654 B2 Page 1 of 1
DATED : November 22, 2005
INVENTOR(S) : Arnold F. Steed It is certified that error appears in the above-identified patent and that said Letters Patent is hereby corrected as shown below:

<u>Title page,</u>
Item [56], References Cited, U.S. PATENT DOCUMENTS, change
"5,469,337   A   11/1995   Cassarly et al." to -- 5,469,537   A   11/1995   Seki --.

Signed and Sealed this

Eleventh Day of April, 2006

JON W. DUDAS
*Director of the United States Patent and Trademark Office*